(12) United States Patent
Vadai et al.

(10) Patent No.: US 7,680,857 B2
(45) Date of Patent: *Mar. 16, 2010

(54) METHOD AND SYSTEM FOR GENERATING HELP FILES BASED ON USER QUERIES

(75) Inventors: Christine E. Vadai, Kirkland, WA (US); Kevin R. McDowell, Monroe, WA (US); Mark D. Huentelman, Bellevue, WA (US); Robert N. Ashby, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

This patent is subject to a terminal disclaimer.

(21) Appl. No.: 11/844,902

(22) Filed: Aug. 24, 2007

(65) Prior Publication Data

US 2007/0294251 A1 Dec. 20, 2007

Related U.S. Application Data

(63) Continuation of application No. 10/780,505, filed on Feb. 17, 2004, now Pat. No. 7,277,884.

(51) Int. Cl.
*G06F 17/30* (2006.01)
(52) U.S. Cl. .................. 707/728; 707/822; 707/E17.01
(58) Field of Classification Search ...................... 707/1, 707/3, 5, 200
See application file for complete search history.

(56) References Cited

U.S. PATENT DOCUMENTS

| | | | | |
|---|---|---|---|---|
| 5,682,469 A | 10/1997 | Linnett | ........................ | 345/473 |
| 5,706,458 A | 1/1998 | Koppolu | ..................... | 715/810 |
| 5,859,638 A | 1/1999 | Coleman et al. | ............. | 715/786 |
| 6,021,403 A | 2/2000 | Horvitz et al. | ................. | 706/45 |
| 6,233,570 B1 | 5/2001 | Horvitz | ........................ | 706/11 |
| 6,260,035 B1 | 7/2001 | Horvitz | ....................... | 706/60 |
| 6,262,730 B1 | 7/2001 | Horvitz | ...................... | 715/707 |
| 6,388,665 B1 | 5/2002 | Linnett | ........................ | 345/473 |
| 6,460,029 B1 | 10/2002 | Fries | .............................. | 707/3 |
| 6,513,031 B1 | 1/2003 | Fries | .............................. | 707/3 |

(Continued)

FOREIGN PATENT DOCUMENTS

EP 0691609 1/1996

(Continued)

OTHER PUBLICATIONS

Hackos, JoAnn T., "Online Documentation: The Next Generation," SIGDOC 97 Snowbird, Utah, Copyright 1997 ACM (6 pages).

(Continued)

*Primary Examiner*—Cheryl Lewis
(74) *Attorney, Agent, or Firm*—Perkins Coie LLP

(57) ABSTRACT

A method and system for generating a help file based on failed user queries. A help file generation system collects failed user queries from user computer systems. The generation system assists a developer in identifying failed user queries that are related to a topic. The generation system then updates the entry in the help file for that topic based on the identified user queries. When a help system subsequently uses that help file, it checks the updated entry when searching for a match and will likely find a match to a relevant topic for a user query that previously failed.

20 Claims, 10 Drawing Sheets

U.S. PATENT DOCUMENTS

| | | | |
|---|---|---|---|
| 6,542,163 B2 | 4/2003 | Gorbet et al. | 715/711 |
| 6,601,059 B1 | 7/2003 | Fries | 707/3 |
| 6,983,271 B2 | 1/2006 | Morrow et al. | 707/3 |
| 7,277,884 B2 * | 10/2007 | Vadai et al. | 707/3 |
| 2002/0126140 A1 | 9/2002 | Gorbet | 715/708 |
| 2002/0147724 A1 | 10/2002 | Fries | 707/100 |
| 2002/0194164 A1 | 12/2002 | Morrow | 707/3 |

FOREIGN PATENT DOCUMENTS

| | | |
|---|---|---|
| WO | WO98/03907 | 1/1998 |

OTHER PUBLICATIONS

Schweibenz, W., "Does Help Really Help? [Terminology-Related Problems with Online Help Systems]," NFD Information, Wissenschaft und Praxis, vol. 51, No. 4, Jun. 2000 (1 page).

"Answer Wizard Builder," Microsoft Office XP Resource Kit, available at http://office.microsoft.com/en-us/assistance/HA011362751033.aspx.

"Find Stuff Fast With Search," Microsoft Windows Internet Explorer, Using Internet Explorer, Web Browsing Basics, published Mar. 28, 2003, available at http://office.microsoft.com/en-us/assistance/HA011362751033.aspx.

\* cited by examiner

METHOD AND SYSTEM FOR GENERATING HELP FILES BASED ON USER QUERIES

CROSS-REFERENCE TO RELATED APPLICATION(S)

This application is a continuation of U.S. patent application Ser. No. 10/780,505, U.S. Pat. No. 7,277,884, entitled "METHOD AND SYSTEM FOR GENERATING HELP FILES BASED ON USER QUERIES," filed on Feb. 17, 2004, which application is hereby incorporated by reference in its entirety.

TECHNICAL FIELD

The described technology relates to generating help files for use in providing help information to users of computer systems.

BACKGROUND

Many applications (i.e., computer programs) provide user interfaces through which a user can interact with the application. The user interfaces may be very sophisticated and provide the user with hundreds of different features. A user who is not very experienced with an application may not know of the existence of certain features or may not know how to use certain features. To assist such users with the user interface, applications typically provide a help system through which a user can request help information describing the various features. The help information for an application is typically stored in a help file. A help file has an entry for each topic of help information that is available. For example, a word processing application that provides a feature to automatically correct misspellings, an "AutoCorrect" feature, may have a topic describing the feature. Each entry may include the title or name of the topic and content that describes the topic in some detail. FIG. 1 is a diagram that illustrates the structure of an example help file. In this example, the help file includes a content file 101 and an index 102. The content file contains the entries of the help file, and the index provides a mapping from various keywords (including phrases) to the related topics in the content file. In this example, the keywords "AutoCorrect" and "Spelling Correction" are mapped to the entry for the "AutoCorrect" topic. A keyword may be mapped to multiple topics. For example, the "AutoCorrect" keyword may be also mapped to a topic explaining how to turn off the "AutoCorrect" feature.

FIGS. 2A and 2B illustrate typical use of a help system. When a user requests help, the help system displays a dialog box 201. The dialog box includes an input field 202 for a user to enter a keyword of interest. In this example, the user has entered the keyword "spelling." The help system identifies all the keywords in the index of the help file that begin with the word "spelling." The help system then displays those keywords in a keyword display field 203. When a user selects one of the displayed keywords, the help system identifies the topics that are mapped to be selected keyword using the index and, if more than one topic is identified, displays the titles of those topics to the user. The user can then select a topic of interest. When a topic is selected, the help system retrieves and displays the content for the selected topic as shown in dialog box 204.

Typical help systems also allow users to enter queries or questions, rather than simply selecting keywords that happen to be indexed. When a user submits a query, the help system may search the content file to identify topics that match the user query. (A help file may include a search catalog that the help system searches, rather than searching the entire content file. The search catalog maybe generated from the content file and is used to improve the speed of searching.) The help system then displays the titles of those matching topics to the user so that the user can selectively view the content of the topics that the user thinks may be relevant. FIG. 3 illustrates a dialog box for entry of a user query. Dialog box 301 includes an input field 302 for a user to enter their query. The query may be in the form of a question or may be a phrase or words of interest. In this example, the user entered the question "How do I stop my name from being changed?" This question might be asked, for example, if the user's name is "Juli" and the "AutoCorrect" feature is configured to automatically "correct" that word to "July" on the assumption that the user simply misspelled the month. After a query is entered, the help system identifies the topics that best match, that are most relevant to, the query. Help systems may use various well-known search algorithms for identifying the matching topics. The help system then displays the matching topics in a display field 303. The user can then select one of the displayed topics to view its content.

Unfortunately, many of the help systems often do not locate any topics that the user finds relevant. In the example of FIG. 3, the help system determined that the topics "field names" and "stop words" best match the user query. The help system, however, did not identify the "AutoCorrect" topic as matching because none of the non-noise words (e.g., "stop," "name," and "changed") are contained in the content of the "AutoCorrect" topic. In such a situation, the user may not even be aware of the "AutoCorrect" feature and thus may not be able to formulate a query that will identify that topic. The user is only provided with topics that are not relevant to the user's query and has no effective way to identify the relevant topic.

When help files are developed, the help file developers (e.g., technical writers) spend considerable effort in trying to identify topics, content, and indexes that the users will find helpful. As part of their efforts, developers may talk to various users, review newsgroup postings related to the application, talk to the application programmers, and so on when creating a help file. If a developer knew that users often ask the question of FIG. 3, then the developer might create a new topic relating to changing a user's name or might add keywords, such as "stop name changes," to the index that maps to the "AutoCorrect" topic. Such ad-hoc identification of topics and keywords is very expensive and does not result in relevant topics being identified for many user queries.

The expense of developing help files increases significantly when the help files need to be localized (e.g., translated from an original language into a local language). Such localization typically involves more than just straightforward translation of the words of the help file. For example, it may be difficult to find keywords in the local language that accurately convey the meaning of keywords in the original language. In particular, a localization may involve extensive rewriting of the content and identification of new keywords.

It would be desirable to have a way to generate help files that would allow a help system to identify topics that users find relevant to their queries. In addition, it would be desirable to have a technique for the localization of help files that would allow for more efficient and accurate localization.

SUMMARY

A help file generation system generates a help file based on failed user queries, that is, user queries that identified no relevant topics. The generation system collects the failed user queries and provides them to a help file developer. The developer can identify the topic(s) that are relevant to a failed user query. The generation system then updates entries for those topics by adding data derived from the failed user queries (e.g., the queries themselves) to the entries. When a help system uses the updated help file, it factors in the added data in determining whether an entry matches a user query. Thus, when a user again submits a failed user query, the help system will likely match it to a topic that has data derived from a similar failed user query.

DETAILED DESCRIPTION

Figure 1:
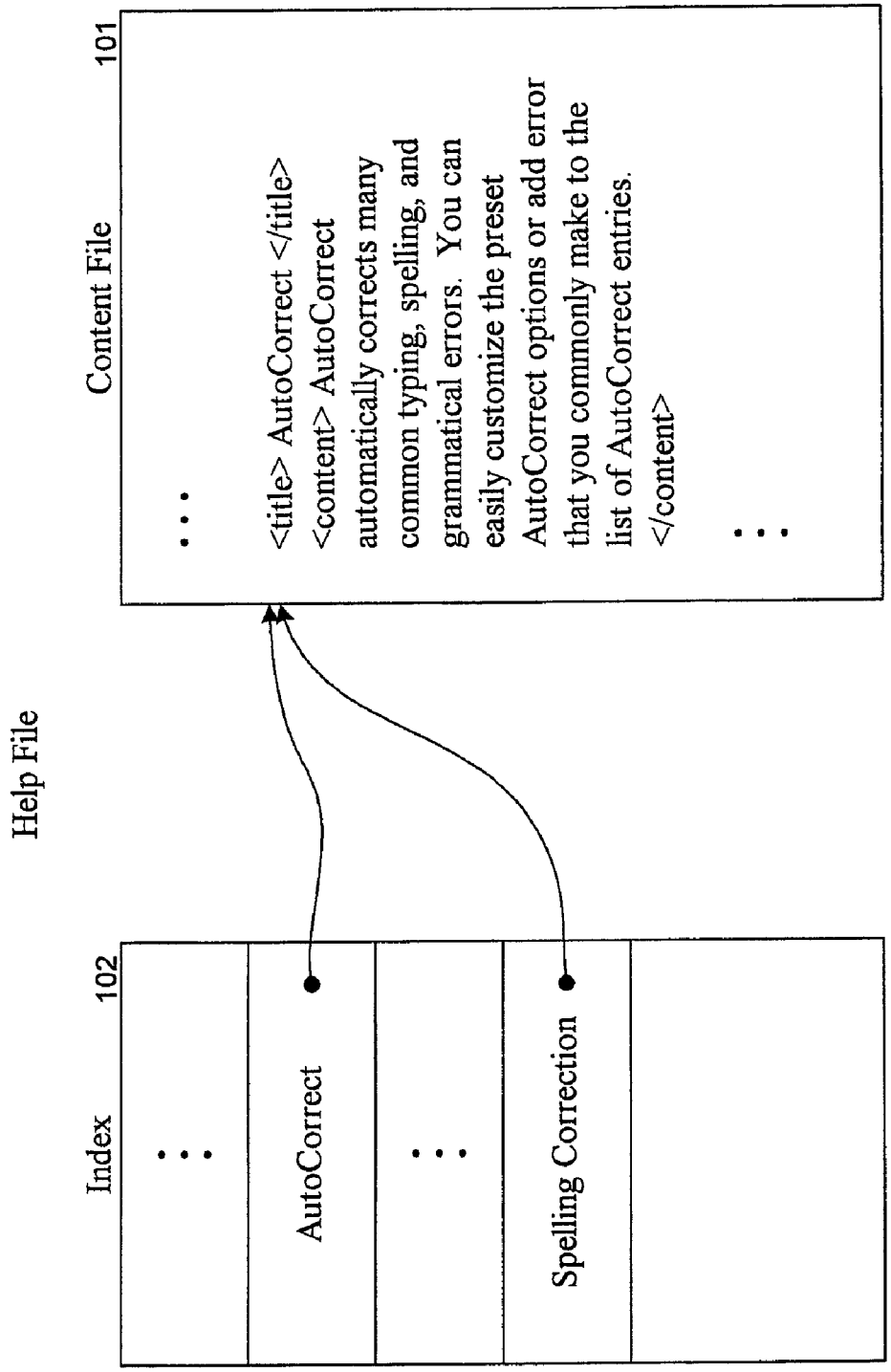
FIG. 1 is a diagram that illustrates the structure of an example help file.
Figure 2A:
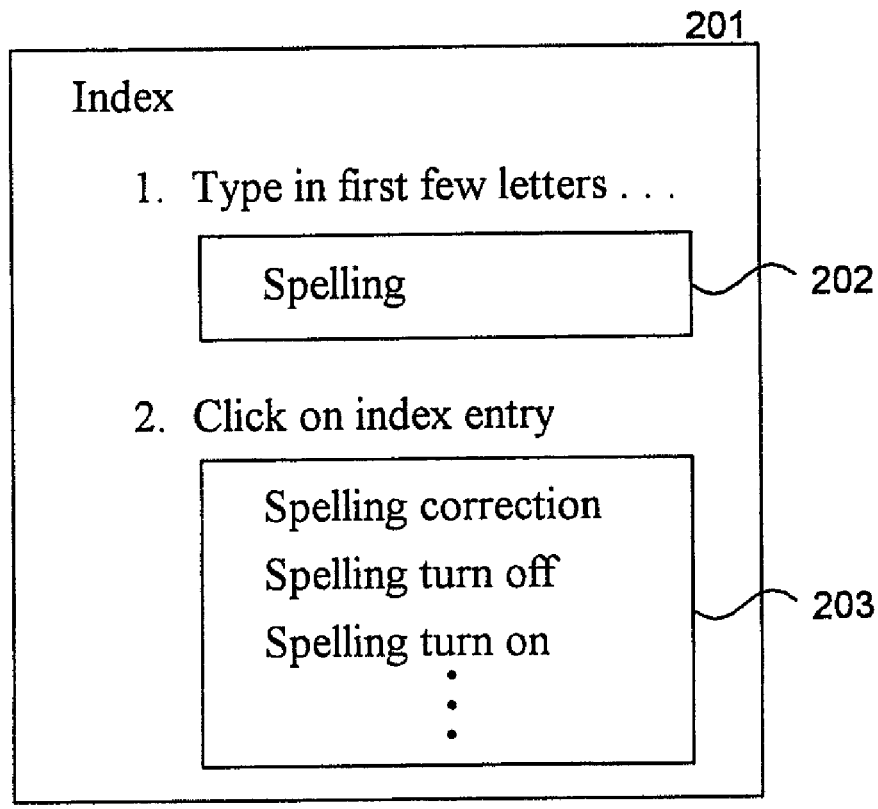
FIGS. 2A and 2B illustrate typical use of a help system.
Figure 2B:
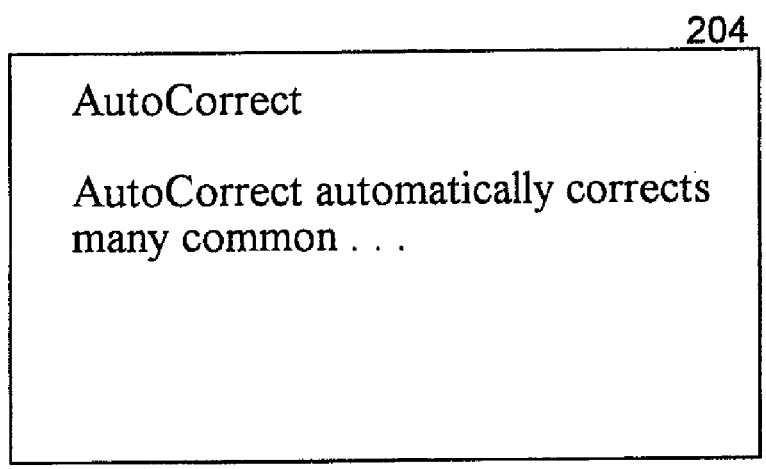
Figure 3:
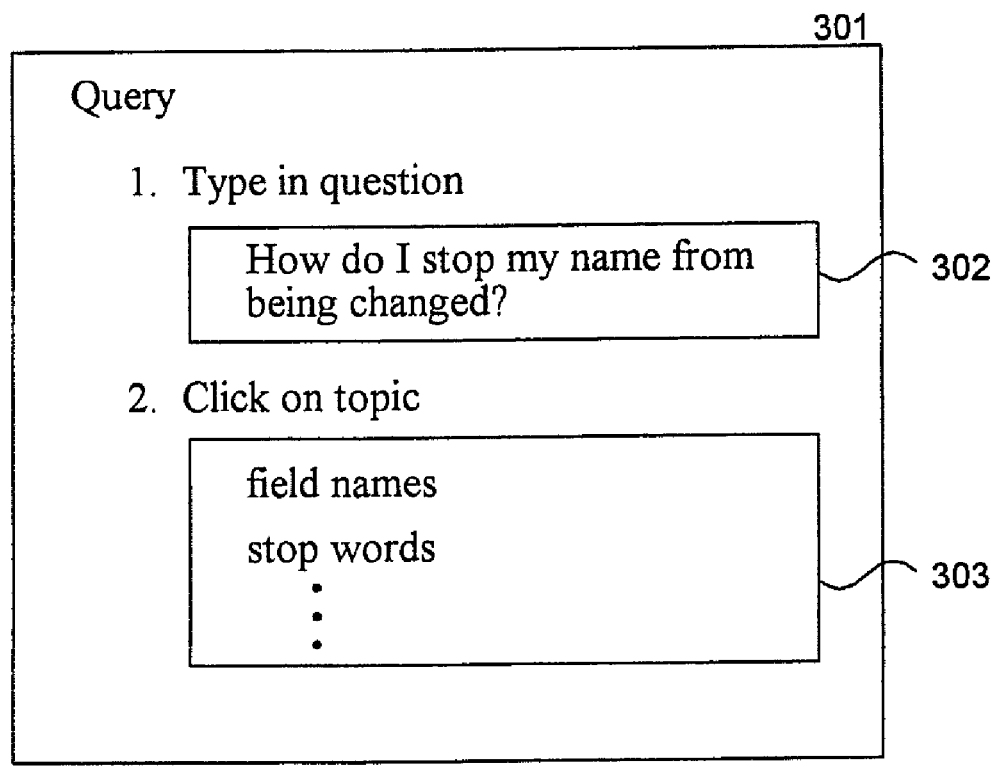
FIG. 3 illustrates a dialog box for entry of a user query.

A method and system for generating a help file based on failed user queries is provided. In one embodiment, a help file generation system collects failed user queries from user computer systems. A "failed user query" is a query that has been classified as having "failed" for some reason. For example, a query may be considered to have failed if a user indicates that none of the topics identified by the query appears to be relevant. A help system may establish that a user query failed by prompting the user to indicate whether the identified topics were relevant to their query. A query may also be considered to have failed, for example, if a user does not view any of the content associated with the identified topics. When a user query fails, then the help system may notify the help file generation system of the failed user query. The generation system stores the failed user queries for use in assisting a developer in developing a help file that will result in relevant topics being identified when similar user queries are submitted. The generation system assists a developer in identifying failed user queries that are related to a topic, that is, the topic is relevant to the failed user query. The generation system then updates the entries in the help file for the relevant topics based on the identified user queries. For example, a developer may identify that the query "How do I stop my name from being changed?" is related to the "AutoCorrect" topic. Based on that identification, the generation system adds data to the entry for the "AutoCorrect" topic that is derived from the identified user query. For example, the generation system may add the user query itself as metadata of the entry. When a help system subsequently uses that help file, it will check the metadata of the entry when searching for a match. If the identified user query is again submitted, the help system will likely identify that the "AutoCorrect" topic matches because of the similarity between the metadata and the submitted user query. Because a developer can effectively link failed user queries to their relevant topics, the help file can be adapted to the actual queries that users submit.

The help file generation system can also be used to assist a developer in identifying new topics or new content for the help file. For example, a developer may determine from the failed user queries that many different users are submitting the query "How do I stop my name from being changed?" or similar queries. Although the developers could link the failed user queries to the "AutoCorrect" topic, the developer could alternatively create a new topic named "Stop changing my name." The content of the topic can be specifically tailored to the name changing problem, rather than providing a general description of the "AutoCorrect" feature. The developer could also decide to update the content of the "AutoCorrect" topic to describe the name changing problem or even change the title of the entry. A help system may be able to identify the new topic or the "AutoCorrect" topic with its updated content to the same user query, based on matching of the title and content of the entries alone. A developer could also link the failed user query to the topics so that the metadata derived from the failed user query can also be used to match topics.

In one embodiment, the help file generation system can be used to more effectively localize help files. Once an original help file is developed in an original language, that help file can be provided to the localizers. After generating the localized content, a localizer can use the help file generation system to identify failed user queries that are related to various topics. The localizer can then translate those user queries and link them to the related topics. The generation system then adds metadata to the entries of the help file based on the translated user queries. Although the localizer could simply translate the user queries of the original help file, some of the user queries may be difficult to translate accurately.

By allowing the localizer to identify the user queries that should be linked, the localizer can select user queries that can be more quickly and accurately translated. In addition, if user queries can be collected in the local language, then the localizer can choose from those queries and avoid translations of the user queries.

Figure 4:
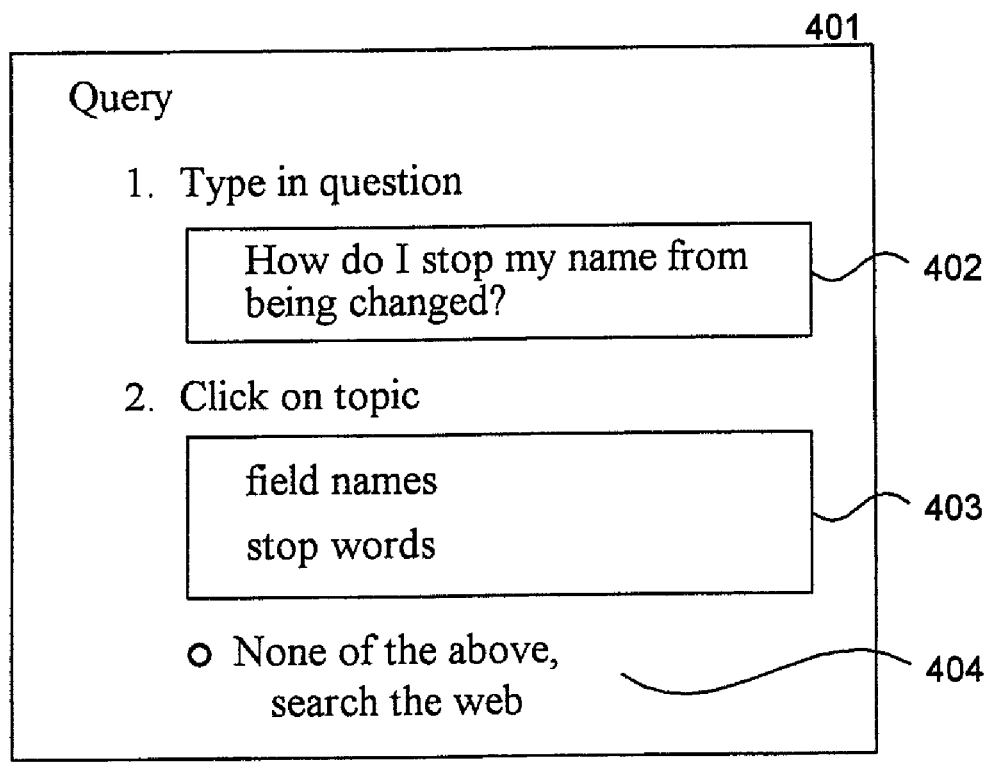
FIG. 4 is a diagram illustrating a dialog box presented by a help system in one embodiment.

FIG. 4 is a diagram illustrating a dialog box presented by a help system in one embodiment. The dialog box 401 includes an input field 402, a display field 403, and a button 404. A user enters their query into the input field, and the local help system executing on the user's computer displays the matching topics in the display field. The local help system allows the user to indicate that none of the topics are relevant by selecting the button. When a user selects the button, the local help system may connect the user to a web-based help system. The web-based help system may provide more comprehensive help information to the user. When connecting, the local help system can provide the failed user query and the identification of the application to the web-based help system. The web-based help system can store the failed user query and application identification for later use by the help file generation system. Alternatively, the local help system can send the failed user query and application identification to the help file generation system directly without connecting to a web-based help system.

Figure 5:
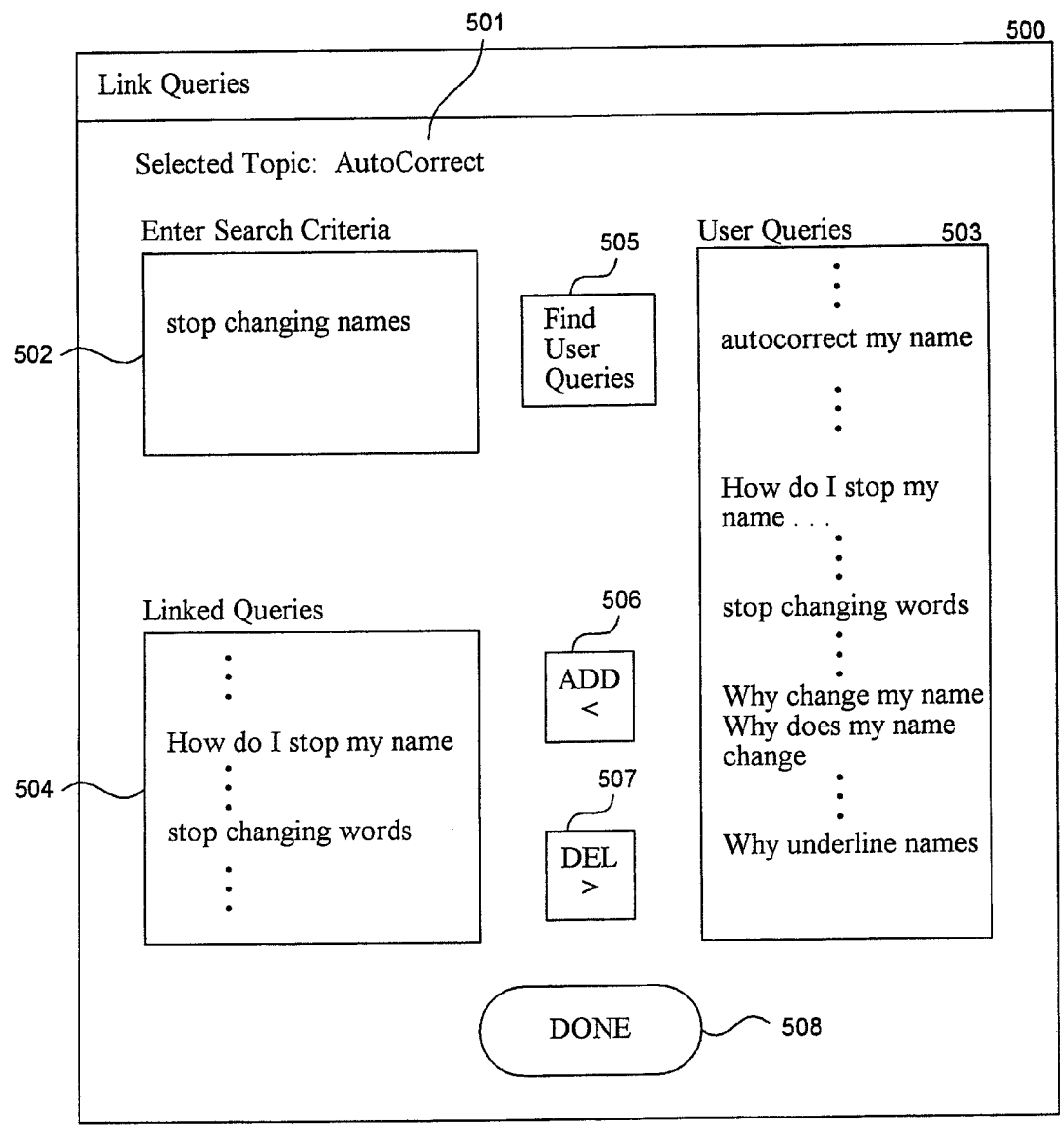
FIG. 5 is a display page illustrating the user interface of the help file generation system in one embodiment.

FIG. 5 is a display page illustrating a user interface of the help file generation system in one embodiment. The display page 500 includes a topic area 501, a search area 502, a user queries area 503, and a linked queries area 504. The display page also includes a find user queries button 505, an add button 506, a delete button 507, and a done button 508. Prior to the display of this display page, the developer selected a topic to which failed user queries are to be linked. In this example, the developer selected the "AutoCorrect" topic. The developer enters a search criteria in the search area to select a subset of the failed user queries that may be related to the selected topic. In this example, the user entered the search criteria "stop changing names." After entering the search criteria, the developer selected the find user queries button to direct the generation system to identify the failed user queries that match the search criteria. The generation system displays the matching user queries in the user queries area. The linked queries area shows those queries that the developer has already indicated should be linked to the selected topic. The user can link additional user queries by selecting a user query or group of user queries from the user queries area and selecting the add button. Similarly, a user can unlink a linked user query by selecting the user query from the linked queries area and selecting the delete button. When the user is done linking user queries to the selected topic, the user selects the done button. In response, the generation system updates the entry in the help file of the selected topic based on the linked queries—although the updating could be deferred until later when all the entries are updated at the same time.

Although not shown in FIG. 5, the help file generation system may also allow the developer to specify the application name as an additional search criterion. When an application name is specified, the generation system only searches for failed user queries reported by the help system of that application. Some help topics may be common to several different applications. When linking failed user queries to such a topic, the developer may want to see the user queries for all those applications. In contrast, when a topic is unique to an application, the developer may want to see the user queries for only that application.

Figure 6:
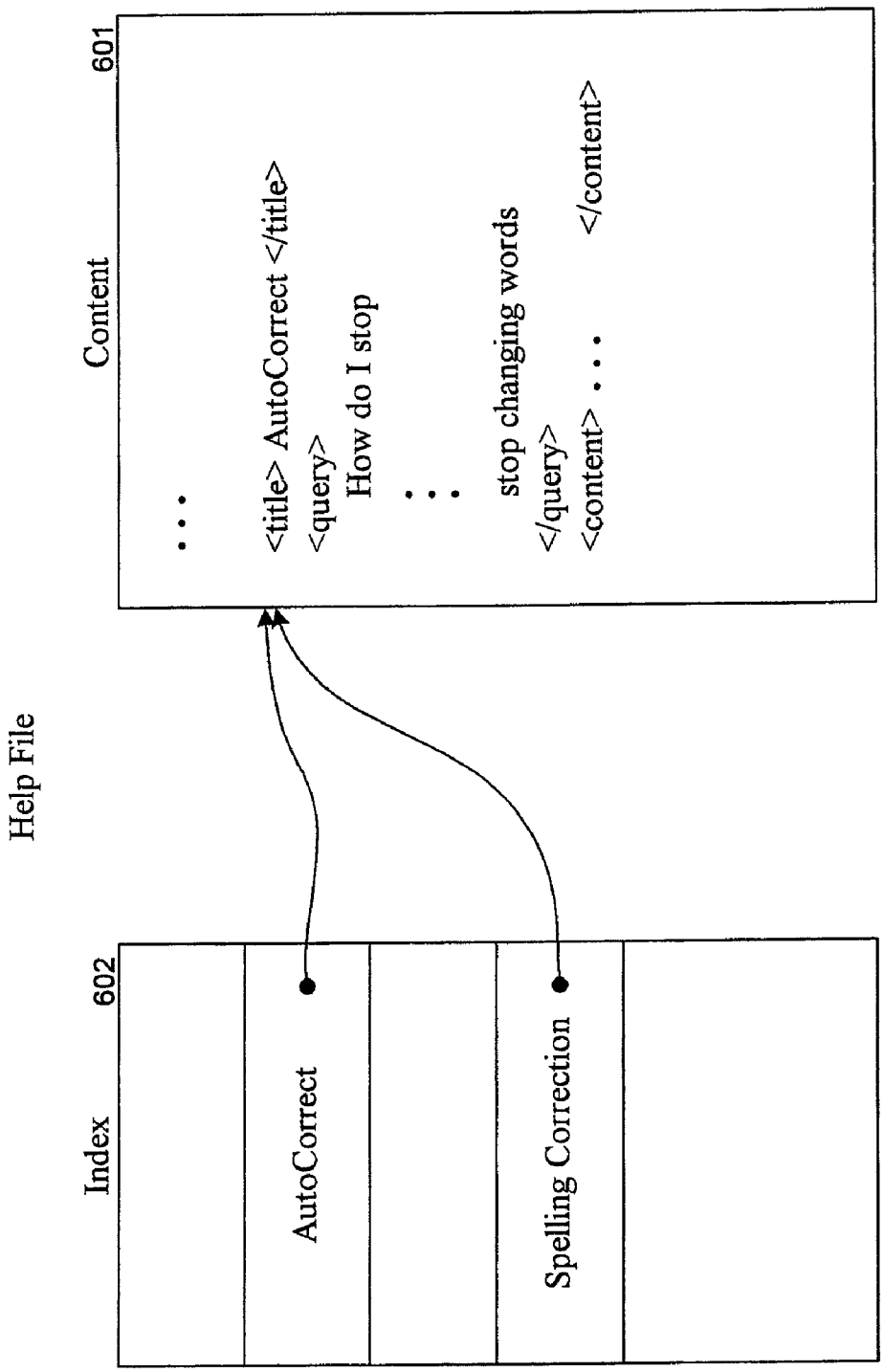
FIG. 6 is a block diagram illustrating a help file that has been modified to include user query metadata.

FIG. 6 is a block diagram illustrating a help file that has been updated based on failed user queries. The content 601 has been modified to include the linked user queries as metadata. The metadata may be specified in various ways, such as using a separate tag for each query or grouping all the user queries within a single tag. In this example, the linked user queries are grouped in a single "<query>" tag. In addition, the generation system may add metadata derived from the user queries, rather than adding the user queries themselves. For example, if the linked user query is "How do I stop my name from being changed?" then the generation system might simply add "stop changing my name" as the metadata. The index 602 may have the same keywords as an index without user query metadata or may be adapted based on the linked user queries. One skilled in the art will appreciate that when the help file includes a search catalog, the search catalog can be generated based on the linked user queries in addition to the content. In such a case, the linked user queries would not need to be stored as metadata along with the content.

Figure 7:
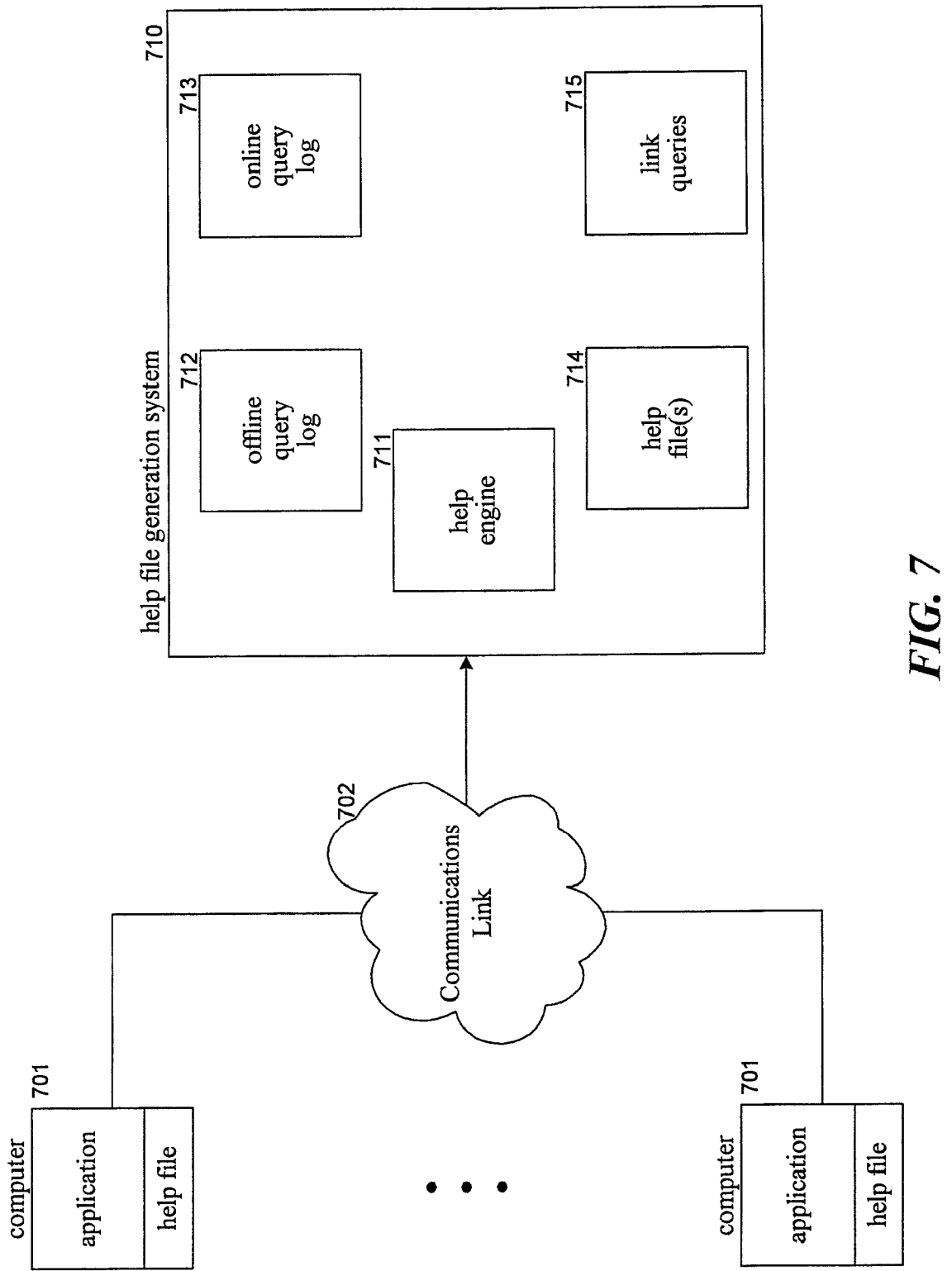
FIG. 7 is a block diagram illustrating components of the help file generation system in one embodiment.

FIG. 7 is a block diagram illustrating components of the help file generation system in one embodiment. The help file generation system 710 is connected to user computers 701 via the communications link 702. Each user computer may have applications that use a local help system to display help information derived from a help file. When the local help system detects that a user has indicated that a user query did not identify any relevant topics, then the local help system sends a message to the generation system via the communications link that includes the failed user query and identifies the application. The help file generation system includes a help engine 711, an offline query log 712, an online query log 713, a help file(s) 714, and a link queries component 715. The help engine receives the messages with the failed user queries and application identification and stores them in the offline query log. The help engine may also function as a web-based help system to provide help information to the users via web pages. The web-based help system may provide more detailed help information than is available via an application's local help file. The web-based help system may track user queries that are submitted to it and then store them in the offline query log along with an application identification and an indication of whether the user queries failed or not. The failure rate of a user query can be used by a developer in deciding how to update a help file. For example, if the same failed user query was reported 10 times by user computers, then a developer might decide to link that failed user query to a certain topic. If, however, the online query log indicates that that user query failed only 1% of the time, then the developer might decide not to link the user query because the users usually find the topics relevant. If the online query log also identifies a topic selected by the user when a query was successful, then a developer could use that information to help decide which topics are relevant to a user query. For example, if users indicate a user query fails 50% of the time and if all the times that user query was successful the users selected the same topic, then a developer may want to link that user query to that topic so that the topic will be ordered higher (i.e., deemed to have greater relevance) in the list of topics that are identified. The link queries component is used by a developer to generate or modify a help file. The link queries component provides the user interface of FIG. 5 using the offline query log to modify a help file. The link queries component allows the developer to specify the application whose help file is to be modified.

The user computer systems and the generation system may include a central processing unit, memory, input devices (e.g., keyboard and pointing devices), output devices (e.g., display devices), and storage devices (e.g., disk drives). The memory and storage devices are computer-readable media that may contain instructions that implement the generation system. In addition, the data structures and message structures may be stored or transmitted via a data transmission medium, such as a signal on a communications link. Various communications links may be used, such as the Internet, a local area network, a wide area network, or a point-to-point dial-up connection. The user computer systems can be any type of computing device, such as a personal computer, cell phone, personal digital assistant, and so on.

FIG. 7 illustrates an example of a suitable operating environment in which the generation system may be implemented. The operating environment is only one example of a suitable operating environment and is not intended to suggest any limitation as to the scope of use or functionality of the generation system. Other well-known computing systems, environments, and/or configurations that may be suitable for use with the generation system include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The generation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 8:
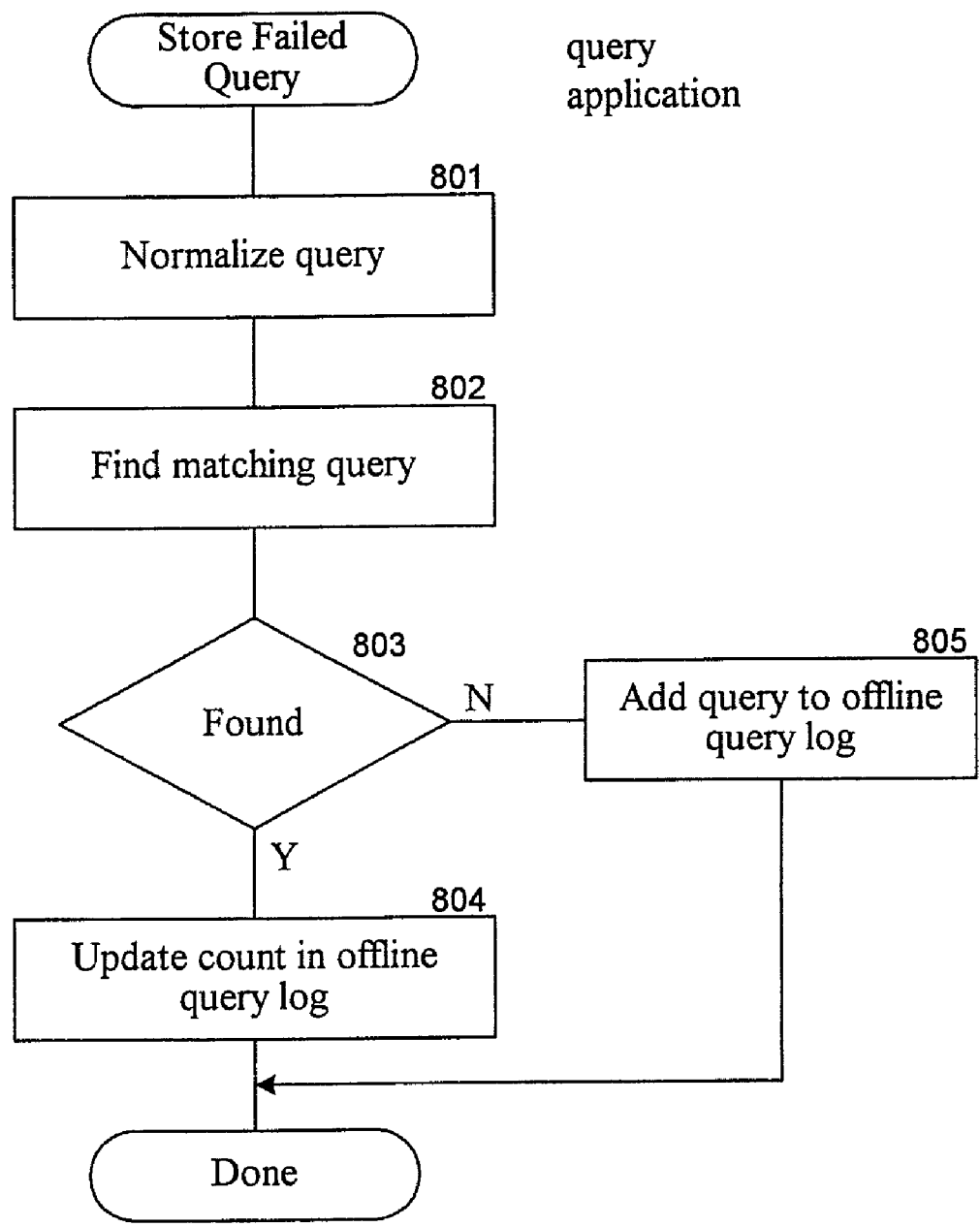
FIG. 8 is a flow diagram illustrating the processing of the help file generation system when it receives a failed user query in one embodiment.

FIG. 8 is a flow diagram illustrating the processing of the help file generation system when it receives a failed user query in one embodiment. In block 801, the component may normalize the user query by, for example, removing capitalization and noise words. In block 802, the component attempts to find a matching user query in the offline query log. In decision block 803, if a matching user query is found, then the component continues at block 804, else the component continues at block 805. In block 804, the component updates a count of the number of times the matching user query was reported as having failed and then completes. The count may be used by a developer in assessing whether the failure of that user query is a common occurrence. In block 805, the component adds the user query to the offline query log and then completes.

Figure 9:
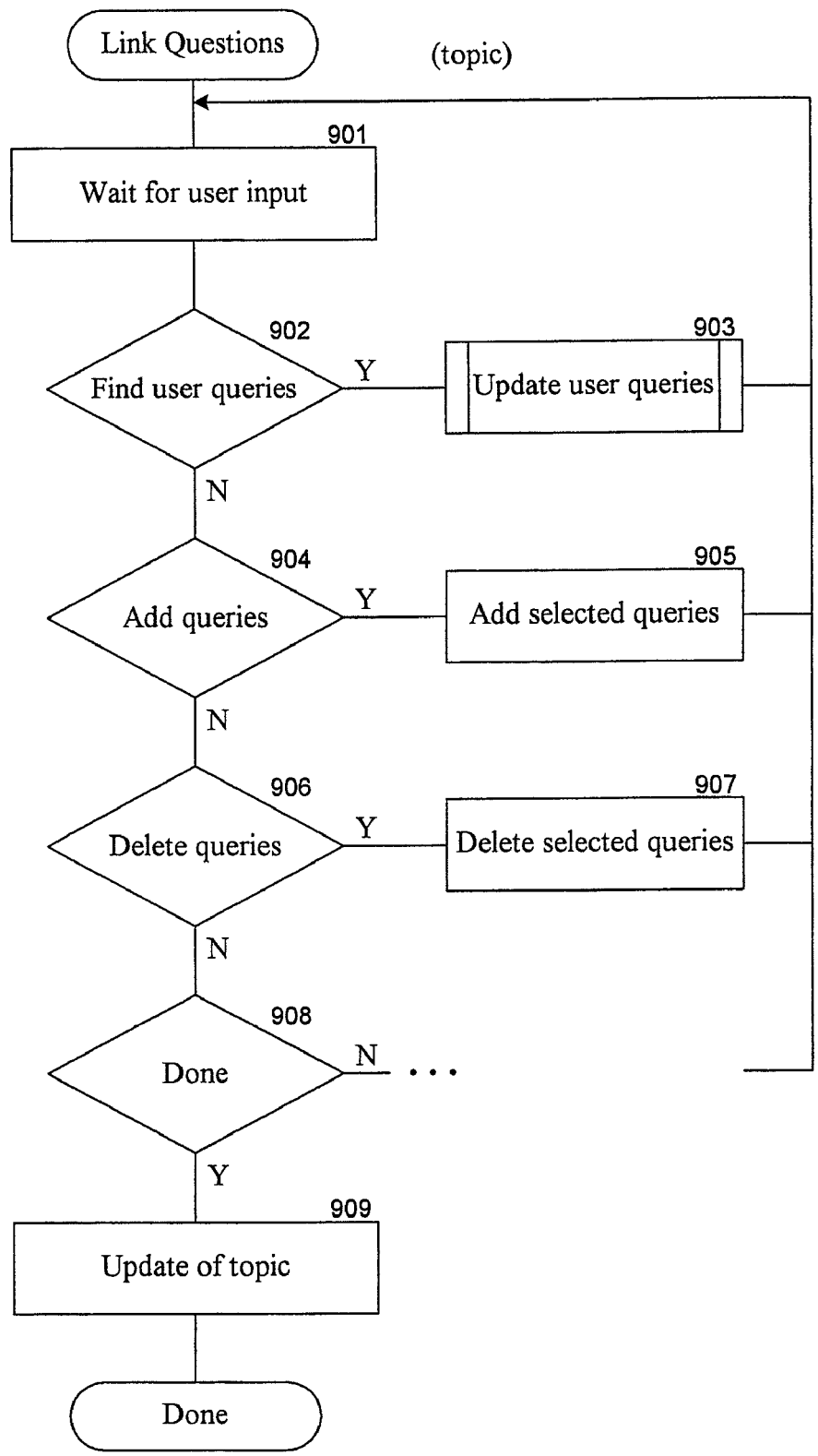
FIG. 9 is a flow diagram illustrating the processing of the link queries component in one embodiment.

FIG. 9 is a flow diagram illustrating the processing of the link query component in one embodiment. This component may be invoked after the user interface of FIG. 5 is displayed. The component is passed the selected topic and application. The component loops processing each input of the developer until the developer specifies that the linking is complete. The component then updates the help file for the application. In block 901, the component waits for developer input. In decision block 902, if the developer input is to find user queries, then the component continues at block 903, else the component continues at block 904. In block 903, the component updates the user queries area with a list of the user queries that match the developer's search criteria and then loops to block 901 to wait for the next developer input. In decision block 904, if the developer input is to add the selected user queries, then the component continues at block 905, else the component continues at block 906. In block 905, the component adds the selected user queries to the linked queries list and then loops to block 901 to wait for developer input. In decision block 906, if the developer input is to delete the selected user queries, then the component continues at block 907, else the component continues at block 908. In block 907, the component removes the selected user queries from the linked queries list and then loops to block 901 to wait for developer input. In decision block 908, if the developer input is complete, then the component continues at block 909, else the component identifies and processes the developer input. In block 909, the component updates the help file to add metadata associated with the linked queries to the selected topic and then completes.

Figure 10:
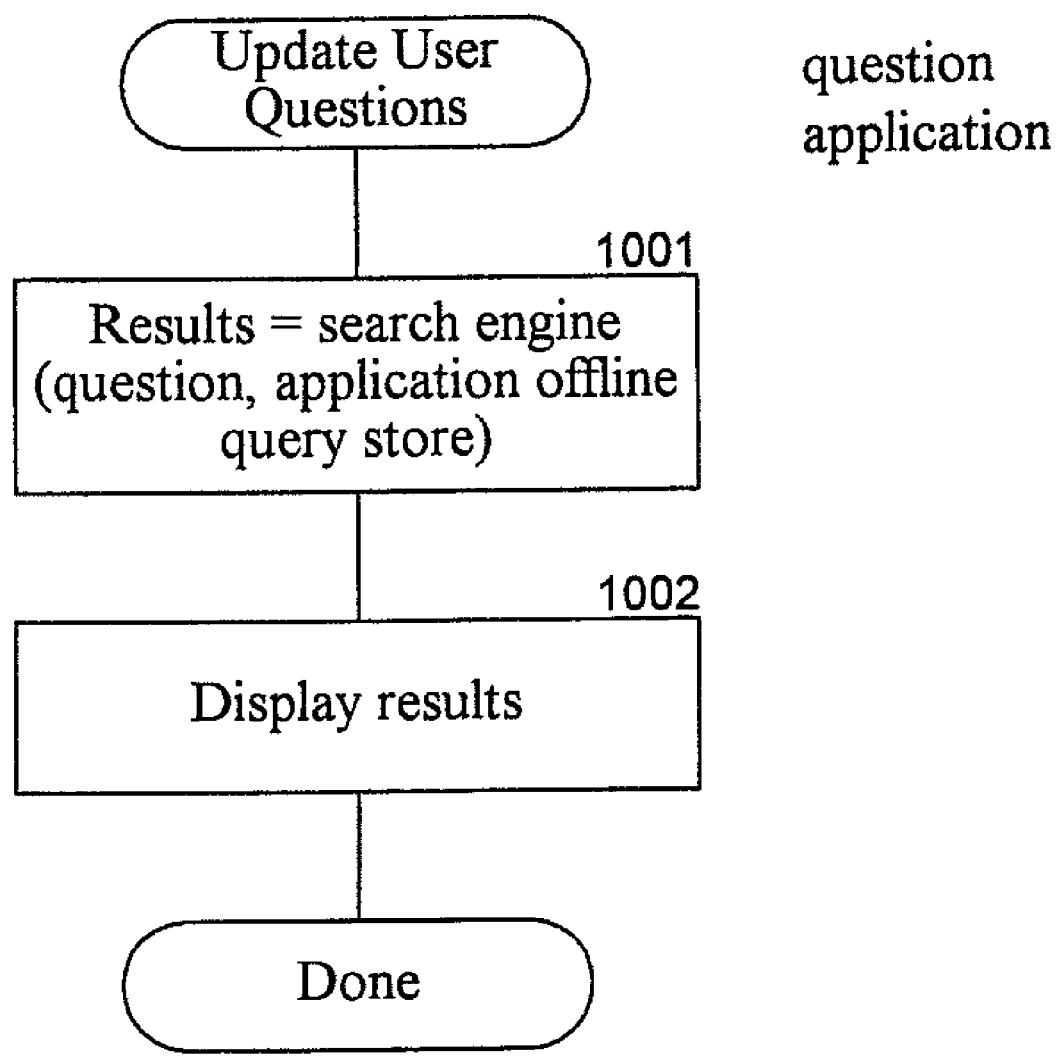
FIG. 10 is a flow diagram illustrating the processing of the update user queries component in one embodiment.

FIG. 10 is a flow diagram illustrating the processing of the update user queries component in one embodiment. The component is passed an indication of a search criteria and an application criteria. In block 1001, the component searches the offline query log for user queries that match the search criteria and application criteria. In block 1002, the component displays the matching user queries in the user queries area and then returns.

From the foregoing, it will be appreciated that specific embodiments of the invention have been described herein for purposes of illustration, but that various modifications may be made without deviating from the spirit and scope of the invention. One skilled in the art will appreciate that various techniques may be used to determine whether a user query failed. For example, a user query that identifies no topics or only identifies topics below a certain relevance level may be deemed to have failed. Also, if the user does not select any of the identified topics, then the user query may be deemed to have failed. More generally, a failed user query can refer to any user query that is provided to a help file system for the purpose of modifying the help file. Moreover, indexes can be augmented based on the failed user queries by automatically indexing based on the metadata of the entries or by a developer manually adding keywords derived from the linked user queries. In this way, the keywords can, over time, migrate to those terms actually being used by users, rather than to those terms that developers only think may be helpful to users. Accordingly, the invention is not limited except as by the appended claims.

We claim:

1. A method in a computer system for generating a help file having topics, the method comprising:
   collecting failed user queries, a user query being a query submitted by a user for searching the help file to identify topics relevant to the user query and a failed user query being a user query in which the identified topics after being presented to the user were considered to be not relevant to the user query;
   receiving a selection of a topic that was not identified as being relevant to a failed user query;
   receiving a selection of some of the collected failed user queries; and
   modifying the help file so that the selected topic is more likely identified as being relevant to the selected user queries so that when a user submits one of the selected user queries to search the modified help file the selected topic is identified as being relevant to the submitted user query.

2. The method of claim 1 wherein the modifying includes adding data derived from the selected user queries to an entry of the selected topic.

3. The method of claim 2 wherein the derived data is added as metadata that is searched by a help system when determining whether a topic matches a user query.

4. The method of claim 2 wherein when a help system searches for topics that match a user query, the help system weights matches within the derived data of the topics more heavily than matches within the content of the topics.

5. The method of claim 1 wherein the modifying includes adding data derived from the selected user queries to a search catalog of the help file.

6. The method of claim 5 wherein the derived data is added as metadata that is searched by a help system when determining whether a topic matches a user query.

7. The method of claim 5 wherein when a help system searches for topics that match a user query, the help system weights matches based on the derived data of the topics more heavily than matches based on the content of the topics.

8. The method of claim 1 wherein the receiving of the selection of some of the collected user queries includes:
   receiving a search criteria; and
   searching the collected user queries for those that match the received search criteria.

9. The method of claim 8 wherein the receiving of the selection of some of the collected user queries includes:
   displaying the matching user queries; and
   receiving a selection of some of the matching user queries.

10. The method of claim 9 wherein the modifying of the entry includes adding data derived from the selected matching user queries to the entry for the selected topic.

11. A computer system for modifying a help file having topics, comprising:
   a component that collects failed user queries, a user query being a query submitted by a user for searching the help file to identify topics relevant to the user query and a failed user query being a user query in which the identified topics after being presented to the user were considered to be not relevant to the user query;
   a component that selects a collected failed user query; and a component that modifies the help file based on the selected user query so that a selected topic is more likely identified when the selected user query is submitted by a user to search the help file for topics relevant to the selected user query.

12. The computer system of claim 11 wherein the modifying includes adding the selected user queries to an entry for the selected topic.

13. The computer system of claim 11 wherein the failed user queries are collected from user computer systems.

14. The computer system of claim 11 wherein the component that selects receives a search criteria and searches the collected user queries for those that match the received search criteria.

15. The computer system of claim 14 wherein the component that selects displays a matching user query and receives a selection of some of the matching user queries.

16. The computer system of claim 15 wherein the component that modifies adds the selected matching user query to an entry for the selected topic.

17. A method in a help system for providing help information to a user, the method comprising:
    providing a help file that includes an entry for each topic, each entry having a title, content, and some of the entries having data derived from failed user queries, a user query being a query submitted by a user for searching the help file to identify topics relevant to the user query and a failed user query being a user query in which the identified topics after being presented to the user were considered to be not relevant to the user query;
    receiving a user query; and
    searching the provided help file for a topic that matches the received user query, a match determined based at least in part on a comparison of the received user query to the data derived from failed user queries so that a topic that would not be identified as being relevant to the received user based on the title and the content of the topic is identified as being relevant based on the data of the topic derived from the failed user queries.

18. The method of claim 17 including displaying the content of a topic that matches.

19. The method of claim 17 wherein the data derived from the failed user queries includes the failed user queries.

20. The method of claim 17 wherein the searching gives more weight to the data derived from the failed user queries than to the content of an entry when determining whether the entry matches the received user query.

* * * * *